(12) United States Patent
Kinuta et al.

(10) Patent No.: US 9,397,325 B2
(45) Date of Patent: Jul. 19, 2016

(54) SAFETY VENT AND ELECTROCHEMICAL DEVICE

(71) Applicant: OPTNICS PRECISION CO., LTD., Ashikaga-shi, Tochigi (JP)

(72) Inventors: Seichin Kinuta, Ashikaga (JP); Atsushi Nishino, Neyagawa (JP); Yoshiyuki Ichinosawa, Ashikaga (JP); Masashi Kobayashi, Ashikaga (JP)

(73) Assignee: OPTNICS PRECISION CO., LTD, Ashikaga-shi (JP)

( * ) Notice: Subject to any disclaimer, the term of this patent is extended or adjusted under 35 U.S.C. 154(b) by 336 days.

(21) Appl. No.: 14/123,228

(22) PCT Filed: Mar. 26, 2013

(86) PCT No.: PCT/JP2013/058835
§ 371 (c)(1),
(2) Date: Dec. 2, 2013

(87) PCT Pub. No.: WO2013/146803
PCT Pub. Date: Oct. 3, 2013

(65) Prior Publication Data
US 2014/0120387 A1 May 1, 2014

(30) Foreign Application Priority Data
Mar. 28, 2012 (JP) .................. 2012-075207

(51) Int. Cl.
*H01M 2/12* (2006.01)
*H01M 2/02* (2006.01)
(Continued)

(52) U.S. Cl.
CPC .............. *H01M 2/1223* (2013.01); *H01G 11/14* (2013.01); *H01G 11/18* (2013.01);
(Continued)

(58) Field of Classification Search
CPC ... H01M 2/12; H01M 2/1241; H01M 2/1252; H01M 2/1276
USPC ........................................................... 429/54
See application file for complete search history.

(56) References Cited

U.S. PATENT DOCUMENTS 6,521,024 B1 * 2/2003 Akahori .............. H01M 2/1241
96/12
2003/0049521 A1 3/2003 Iwase et al.
(Continued)

FOREIGN PATENT DOCUMENTS

CN 1407638 4/2003
CN 101946350 1/2011
(Continued)

OTHER PUBLICATIONS

English language translation of the following: Office action dated May 6, 2015 from the SIPO in a Chinese patent application corresponding to the instant patent application. This office action translation is submitted now in order to supplement the understanding of the cited references which are being disclosed in the instant Information Disclosure Statement.
(Continued)

*Primary Examiner* — Basia Ridley
*Assistant Examiner* — James Erwin
(74) *Attorney, Agent, or Firm* — SOLARIS Intellectual Property Group, PLLC

(57) ABSTRACT

A safety vent including: a vent 3 that allows gas generated inside a laminate type battery 2 to release to the outside, a gas permeated membrane 4 through which the gas permeates, and a housing case 5 that internally houses the vent 3 and the gas permeated membrane 4, and that is attached to a gas spout out port 24 formed in a laminated exterior casing 21 of the laminate type battery 2.

8 Claims, 20 Drawing Sheets

(51) Int. Cl.
*H01G 11/14* (2013.01)
*H01G 11/18* (2013.01)
*H01G 11/78* (2013.01)
*H01M 10/0525* (2010.01)

(52) U.S. Cl.
CPC .............. *H01G 11/78* (2013.01); *H01M 2/021* (2013.01); *H01M 2/12* (2013.01); *H01M 2/1229* (2013.01); *H01M 2/1241* (2013.01); *H01M 2/1252* (2013.01); *H01M 2/1264* (2013.01); *H01M 2/1276* (2013.01); *H01M 2/0212* (2013.01); *H01M 2/0287* (2013.01); *H01M 10/0525* (2013.01); *Y02E 60/13* (2013.01); *Y02T 10/7011* (2013.01); *Y02T 10/7022* (2013.01)

(56) References Cited

U.S. PATENT DOCUMENTS

| | | | | |
|---|---|---|---|---|
| 2004/0115527 | A1* | 6/2004 | Hiratsuka | H01M 2/0275 429/176 |
| 2008/0241538 | A1* | 10/2008 | Lee | D01D 5/0076 428/401 |
| 2009/0233169 | A1* | 9/2009 | Kakuchi | H01M 2/08 429/185 |
| 2010/0227544 | A1* | 9/2010 | Furuyama | F21V 31/03 454/339 |
| 2010/0314038 | A1 | 12/2010 | Tanuma | |

FOREIGN PATENT DOCUMENTS

| | | |
|---|---|---|
| EP | 0554535 | 8/1993 |
| JP | H05-159765 A | 6/1993 |
| JP | 2007-157678 A | 6/2007 |
| JP | 2008-198664 A | 8/2008 |
| JP | 2010-255757 A | 11/2010 |

OTHER PUBLICATIONS

European Search Report dated Jul. 17, 2015 from the EPO in a European patent application corresponding to the instant patent application. This EESR is submitted now in order to supplement the understanding of the cited reference which is being disclosed in the instant Information Disclosure Statement.

* cited by examiner

SAFETY VENT AND ELECTROCHEMICAL DEVICE

TECHNICAL FIELD

The present invention relates to a safety vent, and in particular relates to an optimal self-return type safety vent for application to electrochemical devices such as secondary batteries, for example lithium secondary batteries and nickel-metal hydride secondary batteries, and to capacitors such as electrolytic capacitors, electric double layer capacitors, and lithium ion capacitors, and to an electrochemical device provided with said safety vent.

BACKGROUND ART

Recently, lithium ion batteries are being widely applied not only for comparatively low power purposes such as in mobile telephones and smartphones, but also for medium power to high power purposes such as electric cars, electric buses, hybrid electric vehicles (HEV), and a backup for fuel cell vehicles. Moreover in 2009 plug-in hybrid vehicles (PEV) came into use, these PEVs employing medium to large size lithium ion batteries. In 2008, large size electric double layer capacitors came into practice as a power source for rapid heating of heating drums in high-speed commercial copiers.

Recently, laminated exterior casing type electrochemical devices as lithium ion battery for HEVs and PEVs and medium size to large size electrochemical devices such as large size electric double layer capacitors are paying attention from said prospect of weight and cost reduction. However, laminate type electrochemical devices are low in strength with respect to internal pressure, and there is a need to provide a safety vent in order to release gas generated inside.

In laminated batteries, safety mechanisms have been proposed wherein a vent body configured from an elastic body such as rubber or a coil spring is provided to an exhaust hole formed in a laminated sheet of an exterior casing, and gas inside said battery is spouted out to the outside when said internal pressure of said battery has risen to a specific level (Japanese Patent Application Laid-Open (JP-A) No. 2007-157678).

Moreover, in for example lithium batteries, structures have been disclosed wherein in order to prevent leakage of an electrolyte at the same time as spouting gas out, small gas venting holes are provided in said exterior casing of a lithium ion battery, and a porous membrane with a continuous air bubble manufactured by stretching a fluororesin (PTFE) film is disposed in said small holes (JP-A No. H5-159765).

However, in a safety vent having a configuration wherein a vent body is provided over an exhaust hole formed through a laminated sheet of an exterior casing, there are issues with said battery long cycle life decreasing as a result of electrolyte leaking out while the vent is open unless any measure is taken for preventing electrolyte leakage during vent release in the case of safety vents in which a vent is opened to spout out internal gas when the internal pressure of said electrochemical device has reached a target pressure or above.

In structures in which a porous fluororesin film is disposed in small gas venting holes provided in an exterior casing, there are issues with said production yield of said porous film, as well as the possibility of not only gas, but also electrolyte, being expelled at the same time as gas release in normal use, causing a deterioration in said battery characteristics.

SUMMARY OF INVENTION

Technical Problem

In consideration of said above circumstances, an object of the present invention is to provide an superior safety vent for attachment to a gas spout out port of an exterior casing in an electrochemical device, and particularly in an electrochemical device provided with a laminated exterior casing, and also to provide an electrochemical device in which said safety vent is attached to a gas spout out port of an exterior casing thereof.

Solution to Problem

A first aspect of the present invention relates to a safety vent and is characterized in including: a gas permeated membrane through which gas generated inside an electrochemical device permeates; a vent that opens when pressure inside said electrochemical device has exceeded a predetermined target pressure, and allows said gas to release to the outside of said electrochemical device through said gas permeated membrane; and a housing case that internally houses said vent and said gas permeated membrane, and that is attached to a gas spout out port formed in an exterior casing of said electrochemical device.

In said safety vent, when force acting on a vent body from gas inside an exterior casing of said electrochemical device exceeds said pressing force of a spring means, said vent body overcomes said pressing force of said spring means to move away from a vent seat, and the gas releases through a gas release hole. In said present safety vent gas accordingly releases when the gas pressure inside said exterior casing exceeds a target value.

Said safety vent is moreover provided with said housing case that houses said vent body and said gas permeated membrane. Since said housing case is attached to said gas spout out port of said exterior casing of said electrochemical device, said safety vent can accordingly be easily attached to said exterior casing of said electrochemical device, and in particular can be firmly attached even when said exterior casing is a laminated exterior casing that is low in strength.

A second aspect of the present invention is the safety vent of the first aspect, wherein said housing case is directly fixed to said gas spout out port of said exterior casing.

In said safety vent, a member for attaching said housing case to said gas spout out port is not required since said housing case is directly fixed to said gas spout out port of said exterior casing of said electrochemical device. The structure can accordingly be simplified in comparison to an embodiment having a configuration including a member for attaching said housing case to said gas spout out port.

A third aspect of the present invention is the safety vent of the first aspect, further including: an empty case that is empty inside, and that is fixed to said gas spout out port of said empty exterior casing, wherein said housing case is attached to said gas spout out port with said empty case interposed therebetween.

Said safety vent is attached to said gas spout out port of said exterior casing with said empty case interposed therebetween. Said safety vent can accordingly be even more easily and securely attached to said gas spout out port of said safety vent in comparison to cases in which said safety vent is directly fixed to said gas spout out port of said exterior casing.

A fourth aspect of the present invention is the safety vent of the third aspect, wherein said empty case includes: a first empty case that is joined to said housing case; and a second empty case that is fixed to said gas spout out port of said exterior casing, and to which said first empty case is joined.

In said safety vent, said safety vent can be attached to said gas spout out port of said exterior casing by attaching said second empty case to said gas spout out port of said exterior casing in advance, and then attaching said safety vent to said gas spout out port of said exterior casing by joining together said first empty case and said second empty case. Said safety vent can accordingly be attached to said gas spout out port more easily than when said empty case is not split into said first empty case and said second empty case.

A fifth aspect of the present invention is the safety vent of any one of the first aspect to the fourth aspect, wherein: said vent includes a vent seat formed with a gas release hole, a vent body, and a spring means that presses said vent body against said gas release hole of said vent seat; said spring means is a plane spring including a base portion formed in a plane frame shape, and a load bearing portion that is resiliently supported through plural spring element portions on said in-plane direction inside of said base portion, wherein said vent body is pressed against said gas release hole by said load bearing portion of said plane spring.

In said safety vent, said vent body is configured so as to be pressed against said gas release hole by said load bearing portion of said plane spring. Said dimension along said overlapping direction of said vent body and said spring means can accordingly be made smaller.

A sixth aspect of the present invention is the safety vent of any one of the first aspect to the fifth aspect, wherein said gas permeated membrane is formed from a nonwoven fabric or a woven fabric, said nonwoven fabric or woven fabric configured by spun fibers of a polyvinylidene fluoride resin and a polyacrylonitrile resin.

In said vent, said gas permeated membrane is formed from a nonwoven fabric or a woven fabric configured by spun fibers of a polyvinylidene fluoride resin and a polyacrylonitrile resin. Said gas permeated membrane accordingly has a high mechanical strength and capability of withstanding long term use. Moreover, electrolyte in said various gases generated inside said electrochemical device can be left inside said electrochemical device, with only byproduct gas being allowed to release to the outside.

A seventh aspect of the present invention is the safety vent of the sixth aspect, wherein said gas permeated membrane is a compound film provided with a fluororesin layer on one face or on both faces of said nonwoven fabric or woven fabric of said seventh aspect.

In said safety vent, said gas permeated membrane is configured by said compound film provided with a fluororesin layer on one face or on both faces of said nonwoven fabric or said woven fabric of said seventh aspect. Said gas permeated membrane accordingly has a higher mechanical strength, and is even better at withstanding long term use, than when said gas permeated membrane is configured from said nonwoven fabric or said woven fabric of said seventh aspect alone.

An eighth aspect of the present invention is the safety vent of either the sixth aspect or the seventh aspect, wherein said gas permeated membrane has a thickness of from 15 µm to 60 µm.

In said safety vent, the mechanical strength of said gas permeated membrane can be maintained, and there is a low resistance to gas permeation during gas release due to configuring said gas permeated membrane with a thickness of from 15 µm to 60 µm.

A ninth aspect of the present invention is the safety vent of any one of the sixth aspect to the eighth aspect, wherein said gas permeated membrane has a fiber diameter of from 0.1 µm to 0.6 µm, and a pore diameter of from 0.25 µm to 0.35 µm.

In said safety vent, the mechanical strength of said gas permeated membrane is maintained and resistance to gas permeation is reduced, thereby securing gas release speed, due to configuring said gas permeated membrane with a fiber diameter of from 0.1 µm to 0.6 µm and a pore diameter of from 0.25 µm to 0.35 µm.

A tenth aspect of the present invention is an electrochemical device including: an exterior casing formed with a gas spout out port, wherein the safety vent of any one of the first aspect to the ninth aspect is attached to said gas spout out port of said exterior casing.

In said electrochemical device, when gas is generated inside said electrochemical device, the gas releases through said safety vent attached to said exterior casing. Expanding of said exterior casing due to internal gas and electrolyte leakage can accordingly be effectively prevented.

An eleventh aspect of the present invention is the electrochemical device of the tenth aspect, wherein said exterior casing is a laminate type exterior casing.

In said electrochemical device, expanding of said exterior casing due to internal gas and electrolyte leakage can be effectively prevented even when said exterior casing is a laminated exterior casing that is comparatively low in strength.

Advantageous Effects of Invention

As described above, the present invention provides an superior safety vent for attachment to a gas spout out port of an exterior casing in an electrochemical device, and also provides an electrochemical device in which said safety vent is attached to a gas spout out port of an exterior casing thereof.

DESCRIPTION OF EMBODIMENTS

Explanation follows regarding an exemplary embodiment of the present invention, with reference to the drawings.

First Exemplary Embodiment

Figure 1:
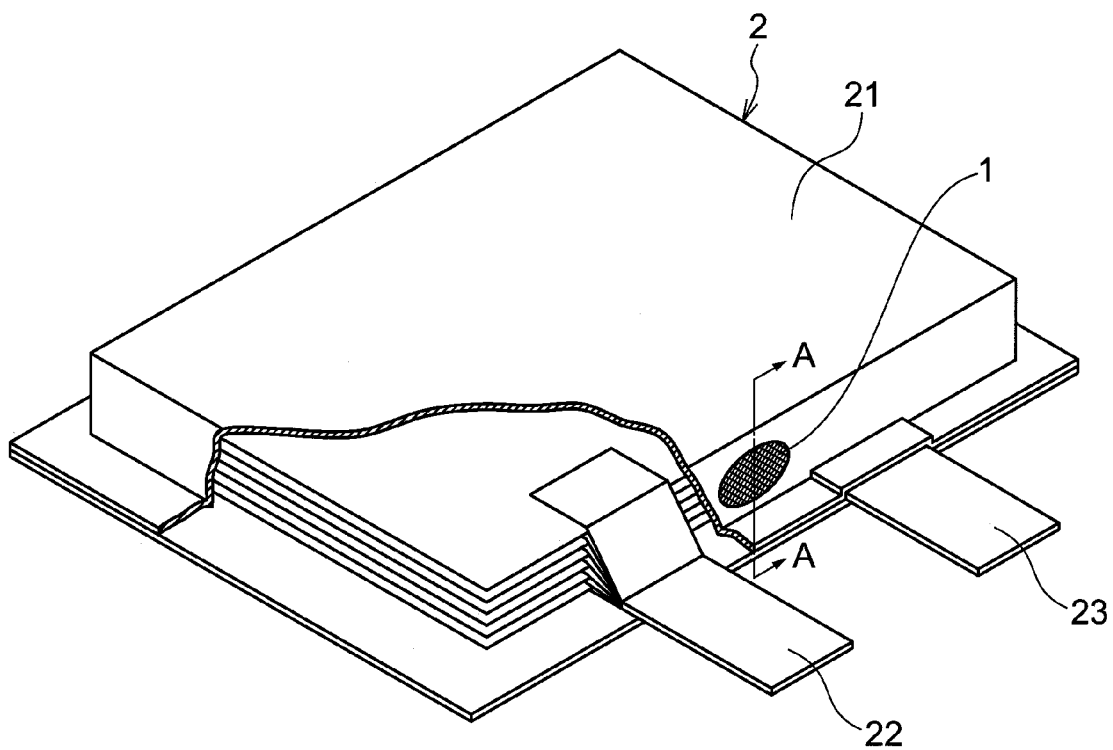
FIG. 1 is a partially cross eyed perspective view illustrating a laminate type battery to which a safety vent according to a first exemplary embodiment of the present invention is attached.

As illustrated in FIGS. 1 and 2, a safety vent 1 of the first exemplary embodiment is a self-return type safety vent including a vent 3 that allows gas generated inside a laminate type battery 2 that is an electrochemical device to release to the outside, and a gas permeated membrane 4 through which the gas permeates.

As illustrated in FIG. 2, the safety vent 1 includes a housing case 5 that houses the vent 3 and the gas permeated membrane 4. The housing case 5 has a bottomed circular cylinder shape with a lower height compared to the diameter thereof. The housing case 5 includes a circular cylinder shaped main body 54, a bottom face 51 formed at one end of the main body 54, an opening portion 50 formed at an opposite side end portion of the main body 54 to the side formed with the bottom face 51, and a flange portion 52 extending from the opening portion 50 side end portion towards outside along the main body 54 radial direction. Note that the bottom face 51 of the housing case 5 is formed with a bottom face opening portion 53. A laminated exterior casing 21 of the laminate type battery 2 is formed with a gas spout out port 24 that spouts out byproduct gas. The overall housing case 5 is positioned inside of the laminated exterior casing 21, and the housing case 5 is fixed at the flange portion 52 to an inside face of the laminated exterior casing 21 using an adhesive 6 at the position formed with the gas spout out port 24.

Note that since the gas spout out port 24 is provided between a negative terminal 22 and a positive terminal 23 of the laminate type battery 2 as illustrated in FIG. 1, the safety vent 1 is obviously also positioned between the negative terminal 22 and the positive terminal 23.

Figure 2A:
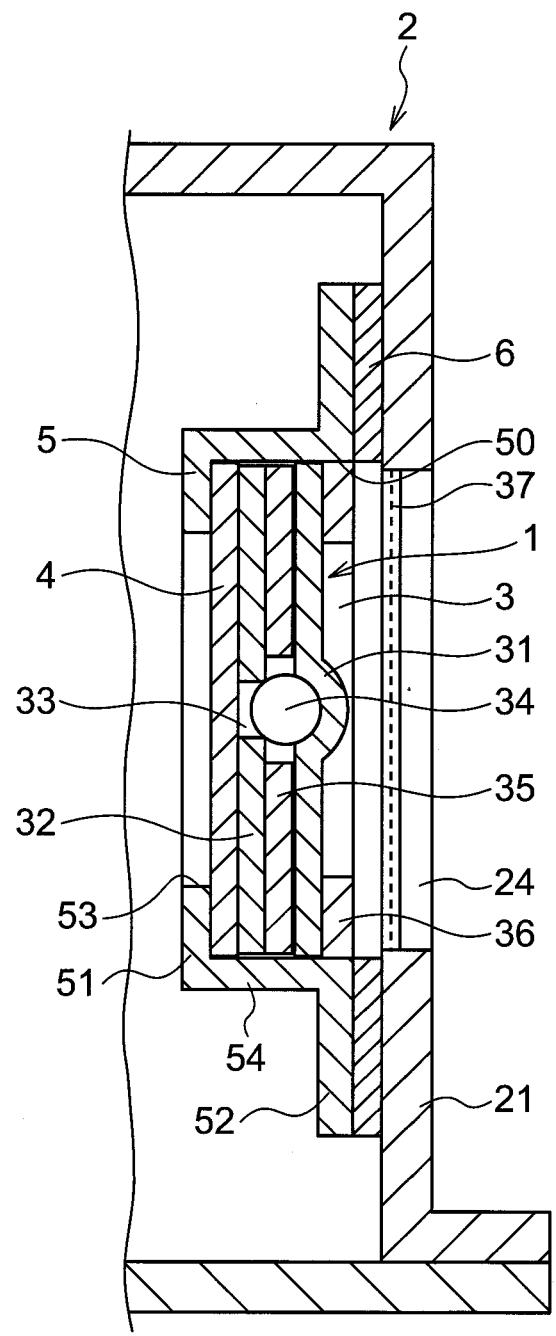
FIGS. 2A and 2B are cross-sections illustrating the laminate type battery illustrated in FIG. 1, taken along line A-A.
Figure 2B:
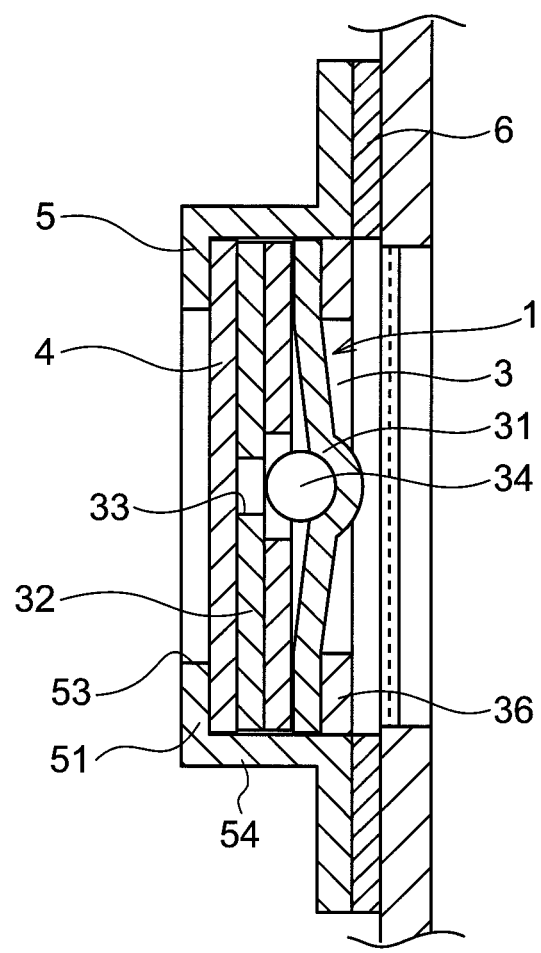

As illustrated in FIGS. 2A and 2B, the vent 3 includes a vent seat 32 formed with a gas release hole 33 that allows gas generated inside the laminate type battery 2 to release, a spherical shaped vent body 34 that closes the gas release hole 33, and a planar spring 31 that is positioned on the opposite side of the vent body 34 to the vent seat 32 and presses the vent body 34 against the vent seat 32 to shut off the gas release hole 33. Note that a gasket 35 is provided between the vent seat 32 and the plane spring 31.

Figure 3:
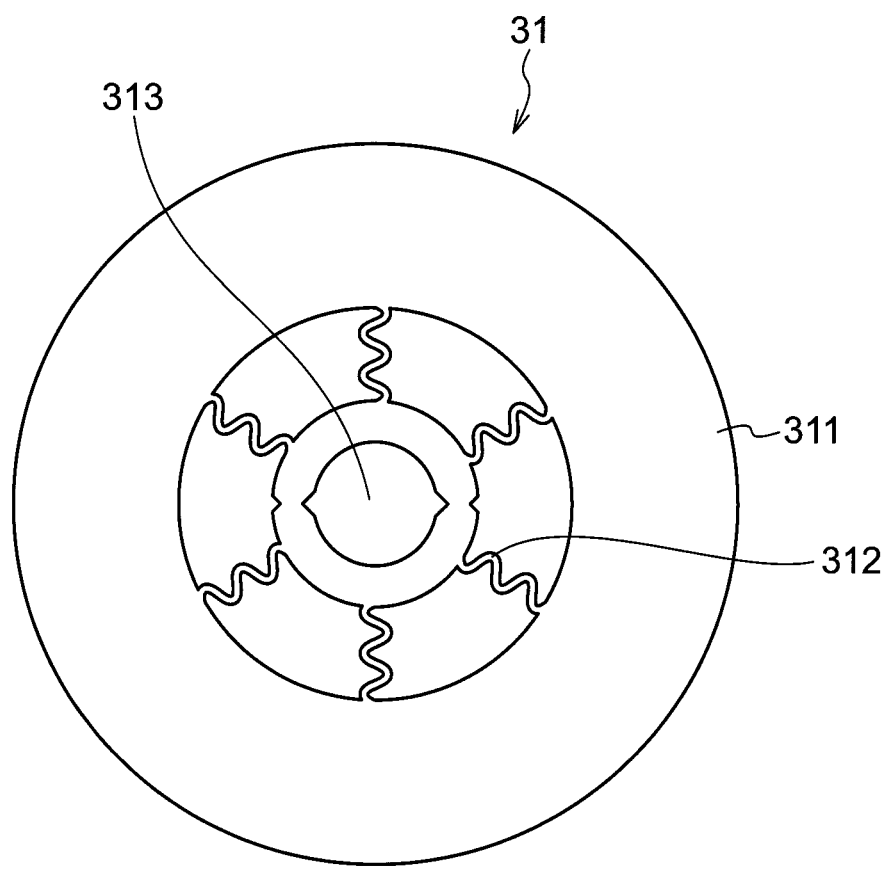
FIG. 3 is a plan view illustrating a plane spring employed in a safety vent according to the first exemplary embodiment of the present invention.

As illustrated in FIG. 3, the planar spring 31 includes a base portion 311 formed in a planar frame shape, and a load bearing portion 313 that is resiliently supported on the in-plane direction inside of the base portion 311 through plural spring element portions 312. The base portion 311, the spring element portions 312, and the load bearing portion 313 are formed integrally to each other in the planar spring 31. The vent body 34 is pressed against the gas release hole 33 of the vent seat 32 at the load bearing portion 313.

Explanation follows regarding the sequence in which the members configuring the gas permeated membrane 4 and the vent 3 are housed in the housing case 5.

The gas permeated membrane 4, the vent seat 32, the vent body 34, the gasket 35 and the plane spring 31 are respectively housed inside the housing case 5 from the bottom face 51 towards the opening portion 50 in that sequence. Each configuration member of the gas permeated membrane 4 and the vent 3 is fixed inside the housing case 5 using a circular ring shaped spring form fixing portion 36.

A porous metallic foil body 37 that protects the gas permeated membrane 4 and the vent 3 from external contamination and from damage due to external mechanical shock is disposed to the outside of the housing case 5.

Figure 4:
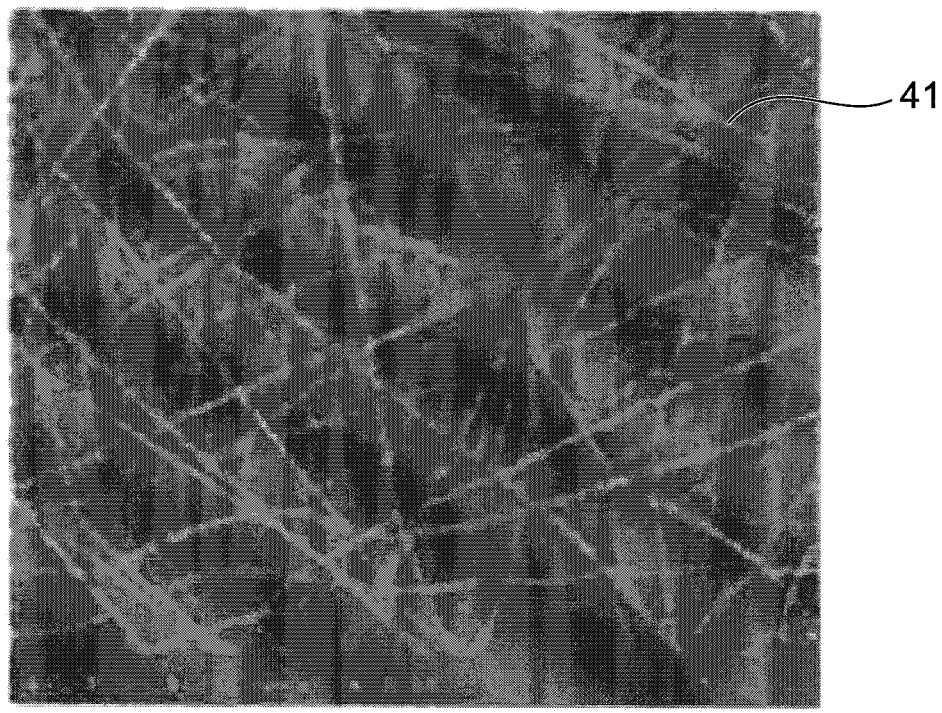
FIG. 4 is a plan view photograph of a gas permeated membrane employed in a safety vent according to the first exemplary embodiment of the present invention.
Figure 5:
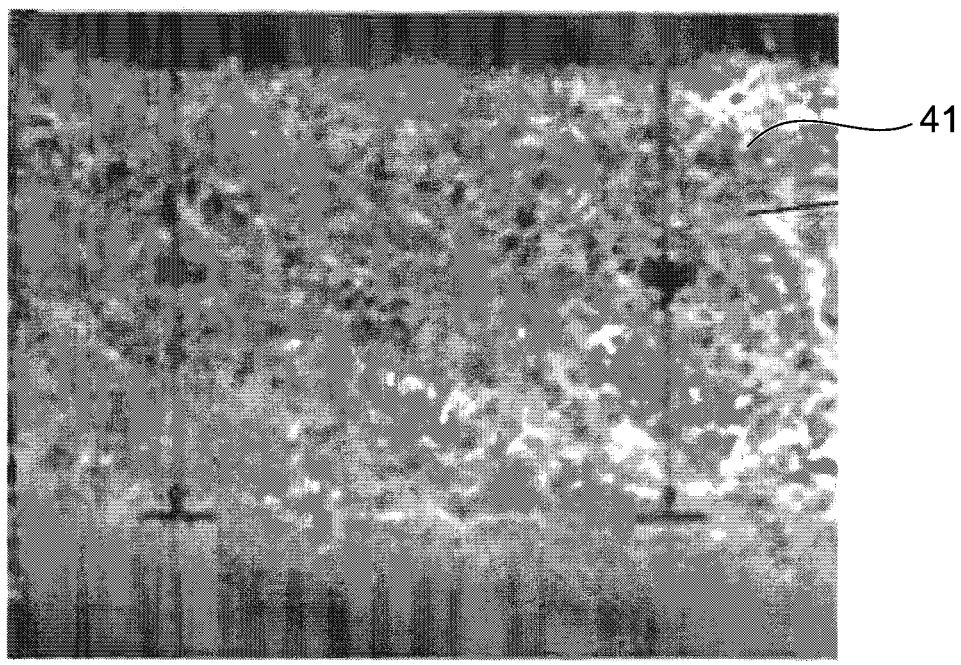
FIG. 5 is a cross-section photograph of a gas permeated membrane employed in a safety vent according to the first exemplary embodiment of the present invention.
Figure 6:
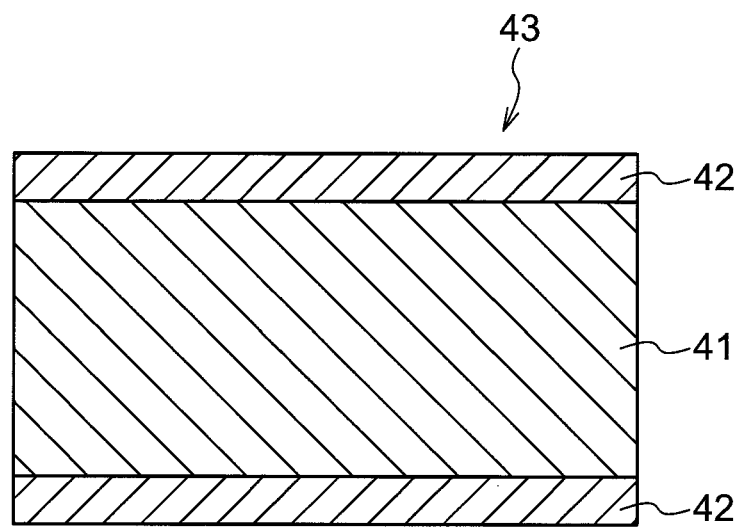
FIG. 6 is a cross-section illustrating a gas permeated membrane employed in a safety vent according to the first exemplary embodiment of the present invention.
Figure 7:
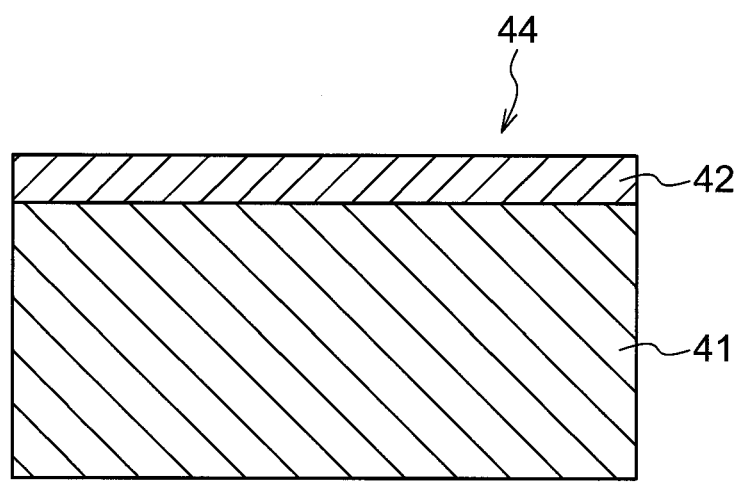
FIG. 7 is a cross-section illustrating another example of a gas permeated membrane employed in a safety vent according to the first exemplary embodiment of the present invention.

As illustrated in FIG. 4, FIG. 5 and FIG. 6, the gas permeated membrane 4 employs a compound film 43 that includes fluororesin layers 42 formed on both faces of a base cloth 41 that is a nonwoven fabric or woven fabric configured by fibers of a polyvinylidene fluoride resin and a polyacrylonitrile resin. The fluororesin layers 42 are formed by applying or coating a fluororesin such as a polyvinylidene fluoride resin to both faces of the base cloth 41. Moreover, as illustrated in FIG. 7, the gas permeated membrane 4 also employs a compound film 44 formed with a fluororesin layer 42 on one face of the base cloth 41.

Fluororesins employed in the fluororesin layers 42 may include for example tetrafluoroethylene/hexafluoropropylene polymers, polytetrafluoroethylene resins, and polyvinyl fluoride resins as well as polyvinylidene fluoride resin.

Although in practice the base cloth 41 alone may be employed as a gas permeated membrane 4 without any problem, in order to withstand long term use, configuration is preferably made with the compound film 43 in which the fluororesin layers 42 are formed on both faces of the base cloth 41, or with the compound film 44 in which the fluororesin layer 42 is formed on one face of the base cloth 41.

The layer thickness of the gas permeated membrane 4 is preferably from 15 μm to 60 μm. When the layer thickness is less than 15 μm, the gas permeated membrane 4 has insufficient mechanical strength, and there is a possibility of damage occurring due to the pressure of gas being expelled from the safety vent 1. While, when the layer thickness exceeds 60 μm the resistance to gas permeation becomes too large. The thickness of the fluororesin layer 42 is preferably from 0.5 μm to 5 μm. When the thickness of the fluororesin layer 42 is less than 0.5 μm there is a possibility that the gas permeated membrane 4 obtained may not be able to withstand long term use, and when the thickness of the fluororesin layer 42 exceeds 5 μm, there is a concern of the resistance to gas permeation becoming too large in the gas permeated membrane 4 that is obtained.

As the base cloth 41, for example, a nonwoven fabric or a woven fabric, which is configured by fibers that are electro-spun employing a spinning solution prepared by dissolving a polyvinylidene fluoride resin and a polyacrylonitrile resin in a solvent as appropriate, can be employed. The proportion of polyvinylidene fluoride resin in the fiber configuring the base cloth 41 is preferably within a range of 30% by weight to 70% by weight. When the proportion of polyvinylidene fluoride resin in the fiber is less than 30% by weight, there are issues with poor heat resistance. On the other hand, it is not desirable for the proportion of polyvinylidene fluoride resin to exceed 70% by weight from the perspectives of softness and flexibility.

The fiber diameter is preferably 0.1 µm or above, and is particularly preferably within a range of 0.1 µm to 0.6 µm. Not only are electro-spinning nozzles for the manufacture of fiber diameters of below 0.1 µm costly, but there is a possibility of the fibers obtained being too fine, such that sufficient strength cannot be obtained for the gas permeated membrane 4.

The gas permeated membrane 4 preferably has a pore diameter of from 0.25 µm to 0.3 µm. When the pore diameter is below 0.25 µm the gas permeation rate is too slow, while when the pore diameter exceeds 0.3 µm it is difficult to separate the electrolyte from the byproduct gas in the gas generated inside the laminate type battery 2.

Note that the gas permeated membrane 4 may also be formed from polyvinylidene fluoride resin alone. Although the layer thickness of the gas permeated membrane 4 formed of polyvinylidene fluoride resin alone is preferably from 10 µm to 30 µm, at this thickness, films configured from polyvinylidene fluoride resin alone lack sufficient mechanical strength, and thus, the film can be damaged due to the pressure of gas being expelled from the safety vent 1.

Explanation follows regarding operation of the safety vent 1, with reference to FIG. 2A and FIG. 2B.
During normal use of the laminate type battery 2, when the internal pressure is below a target pressure (for example of 0.4 MPa to 0.7 MPa), the vent body 34 is pressed against the gas release hole 33 of the vent seat 32 by the load bearing portion 313 of the plane spring 31 as illustrated in FIG. 2A. The gas release hole 33 is accordingly tightly closed.

However, when the internal pressure of the laminate type battery 2 reaches the target pressure or above, as illustrated in FIG. 2B, the vent body 34 receives force in a direction to push the vent body 34 toward the outside of the laminate type battery 2 due to the pressure of the gas inside the laminated exterior casing 21. The load bearing portion 313 of the plane spring 31 is accordingly pushed toward the outside of the laminate type battery 2 by the vent body 34, and the spring element portions 312 extend. The vent body 34 accordingly moves away from the gas release hole 33 of the vent seat 32, thereby opening the gas release hole 33, and gas inside the laminate type battery 2 passes through the gas permeated membrane 4 and releases to the outside. Gas continues to release until the gas pressure inside the laminate type battery 2 returns to a normal range.

In the present invention, the gas permeated membrane 4 employs the fluororesin layers 42 formed on one face or both faces of a nonwoven fabric or a woven fabric obtained by electro-spinning a polyvinylidene fluoride resin and a polyacrylonitrile resin. Accordingly, during release of gas generated inside the laminate type battery 2, electrolyte contained in the gas remains inside the laminate type battery, and only byproduct gas is able to release to the outside.

The safety vent 1 is moreover attached to the gas spout out port 24 inside the laminated exterior casing 21 in a state in which the vent 3 and the gas permeated membrane 4 are housed in an integrated together state in the housing case 5. The safety vent 1 can accordingly be easily and firmly attached to the laminated exterior casing 21 that is low in strength.

Second Exemplary Embodiment

Figure 8:
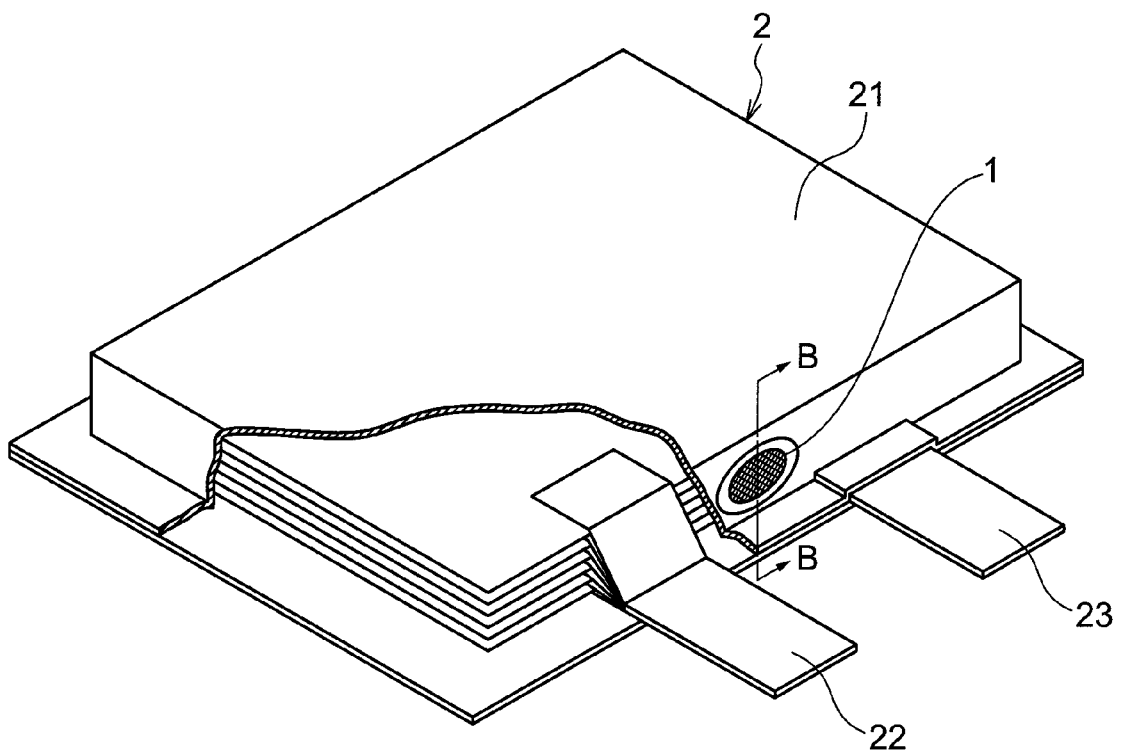
FIG. 8 is a partially cross eyed perspective view illustrating a laminate type battery to which a safety vent according to a second exemplary embodiment of the present invention is attached.
Figure 9:
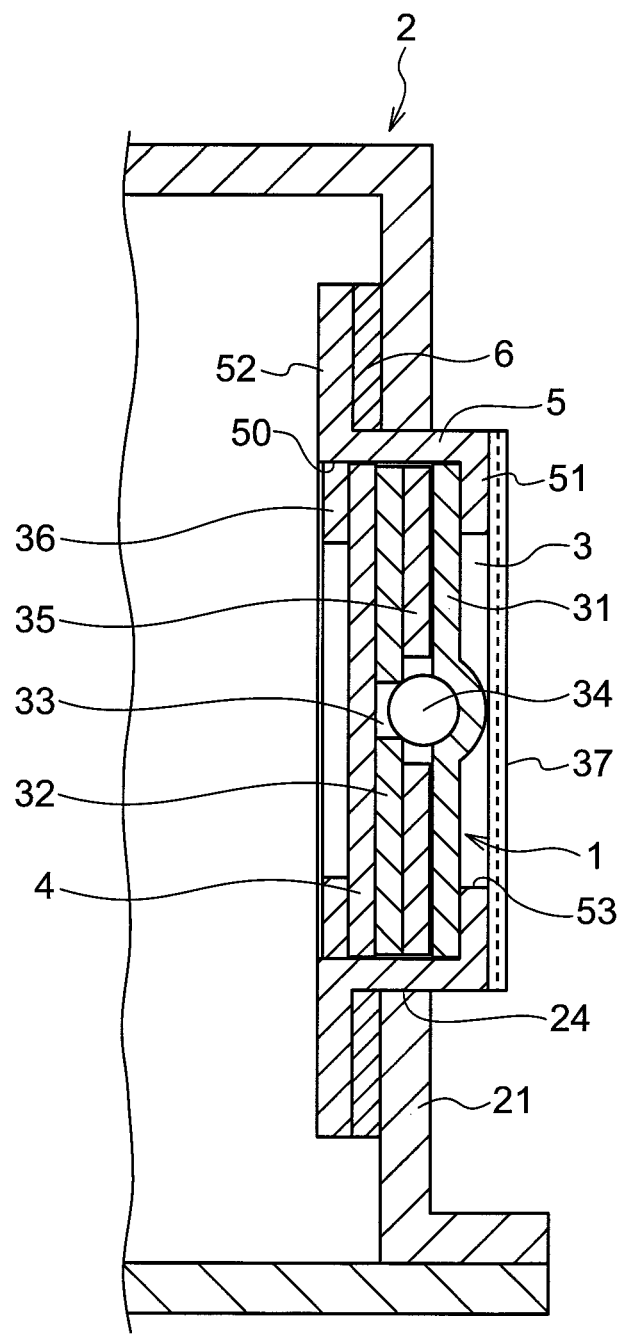
FIG. 9 is a cross-section illustrating the laminate type battery illustrated in FIG. 8, taken along line B-B.

As illustrated in FIG. 8 and FIG. 9, similarly to the safety vent 1 of the first exemplary embodiment, a safety vent 1 of a second exemplary embodiment is self-return type safety vent including a vent 3 that allows gas generated inside a laminate type battery 2 to release to the outside, and a gas permeated membrane 4 through which the gas permeates. Note that members and structures that are the similar to those of the safety vent 1 of the first exemplary embodiment are appended with the same reference numerals as employed in FIG. 1 to FIG. 7 unless specifically indicated otherwise.

Similarly to the housing case 5 of the safety vent 1 of the first exemplary embodiment, in the safety vent 1 of the second exemplary embodiment a housing case 5 includes an opening portion 50, a bottom face 51, a flange portion 52, a bottom face opening portion 53 and a main body 54, however the housing case 5 faces in the opposite direction to that of the safety vent 1 of the first exemplary embodiment. Specifically, the main body 54 and the bottom face 51 are attached in a direction projecting from the gas spout out port 24 of the laminated exterior casing 21 towards the laminated exterior casing 21 outside, and the flange portion 52 is fixed using the adhesive 6 at the portion of the inside face of the laminated exterior casing 21 where the gas spout out port 24 is formed.

Each member of the vent 3, namely the plane spring 31, the vent body 34, the gasket 35 and the vent seat 32, is housed inside the housing case 5 in sequence from the bottom face 51 towards the opening portion 50. The gas permeated membrane 4 is moreover housed on the opening portion 50 side of the vent seat 32. The plane spring 31, the vent body 34, the gasket 35 and the gas permeated membrane 4 are fixed inside the housing case 5 using the ring shaped spring form fixing portion 36. Note that the porous metallic foil body 37 is adhered and fixed to an outside face of the bottom face 53 of the housing case 5. The porous metallic foil body 37 protects the safety vent 1 from mechanical shock and contamination from the outside.

The safety vent 1 of the second exemplary embodiment is similar to the safety vent 1 of the first exemplary embodiment in the points other than those described above. Accordingly the configuration of the plane spring 31, the vent body 34, the gasket 35, the vent seat 32 and the gas permeated membrane 4 is as described in the first exemplary embodiment. Operation of the safety vent 1 is moreover as described in the first exemplary embodiment.

Similarly to the safety vent 1 of the first exemplary embodiment, the safety vent 1 of the second exemplary embodiment is attached to the gas spout out port 24 portion of the inside face of the laminated exterior casing 21 at a flange portion in a state in which the vent 3 and the gas permeated membrane 4 are housed in an integrated together state in the housing case 5. The safety vent 1 can accordingly be easily and firmly attached to the laminated exterior casing 21 that is low in strength.

The housing case 5 is moreover fixed to the inside face of the laminated exterior casing 21 at the flange portion 52 such that the main body 54 and the bottom face 51 project out through the gas spout out port 24 to the laminated exterior casing 21 outside. The overall safety vent 1 is thereby effectively prevented from falling off to the inside of the laminate type battery 2 even when the adhesive 6 deteriorates and the adhesion force with respect to the laminated exterior casing 21 decreases.

Third Exemplary Embodiment

Figure 10:
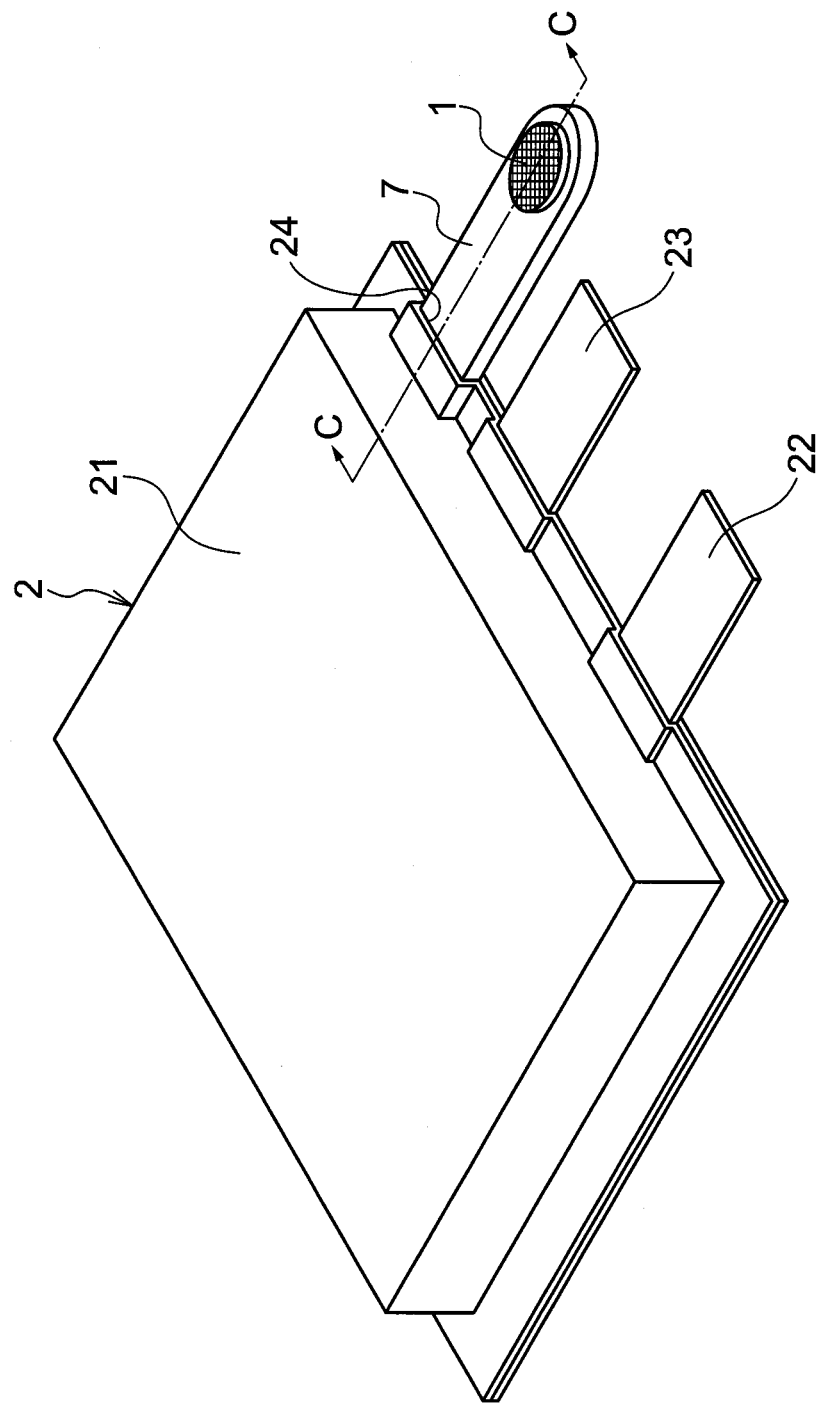
FIG. 10 is a perspective view illustrating a laminate type battery to which a safety vent according to a third exemplary embodiment of the present invention is attached.
Figure 11:
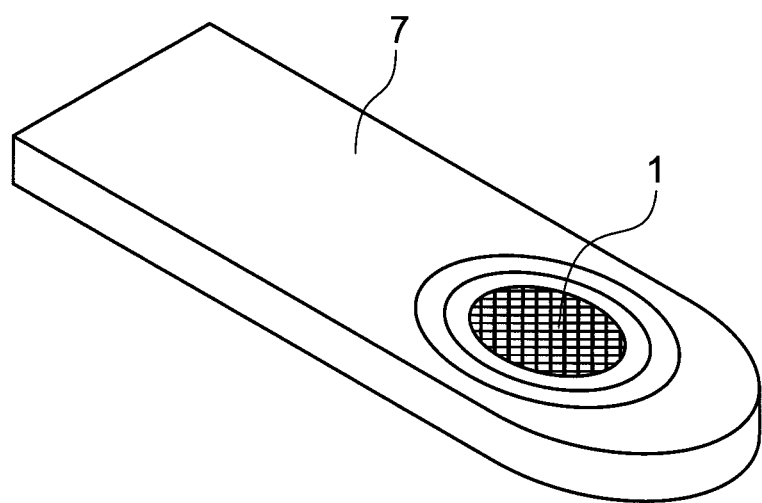
FIG. 11 is a cross-section illustrating the laminate type battery illustrated in FIG. 10, taken along line C-C.
Figure 12:
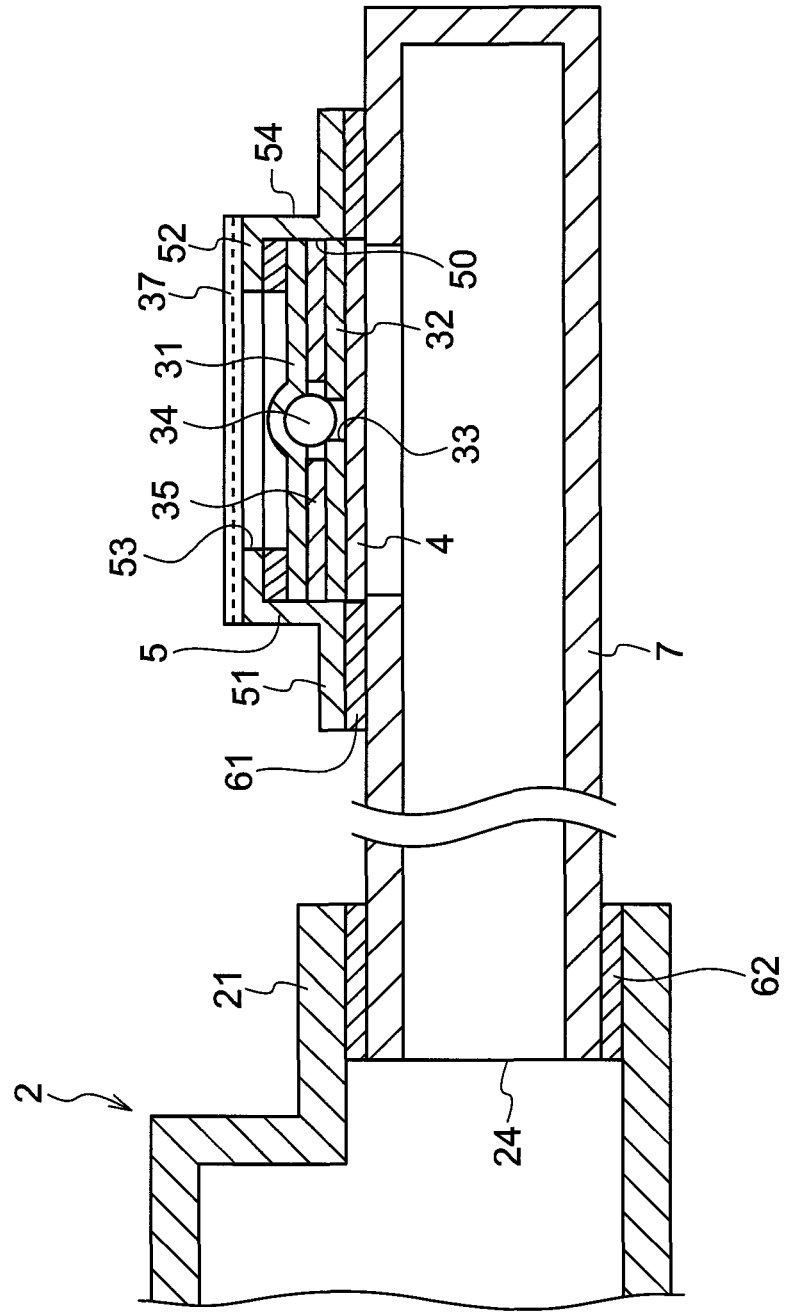
FIG. 12 is a perspective view illustrating a housing case of a safety vent according to the third exemplary embodiment of the present invention.
Figure 13:
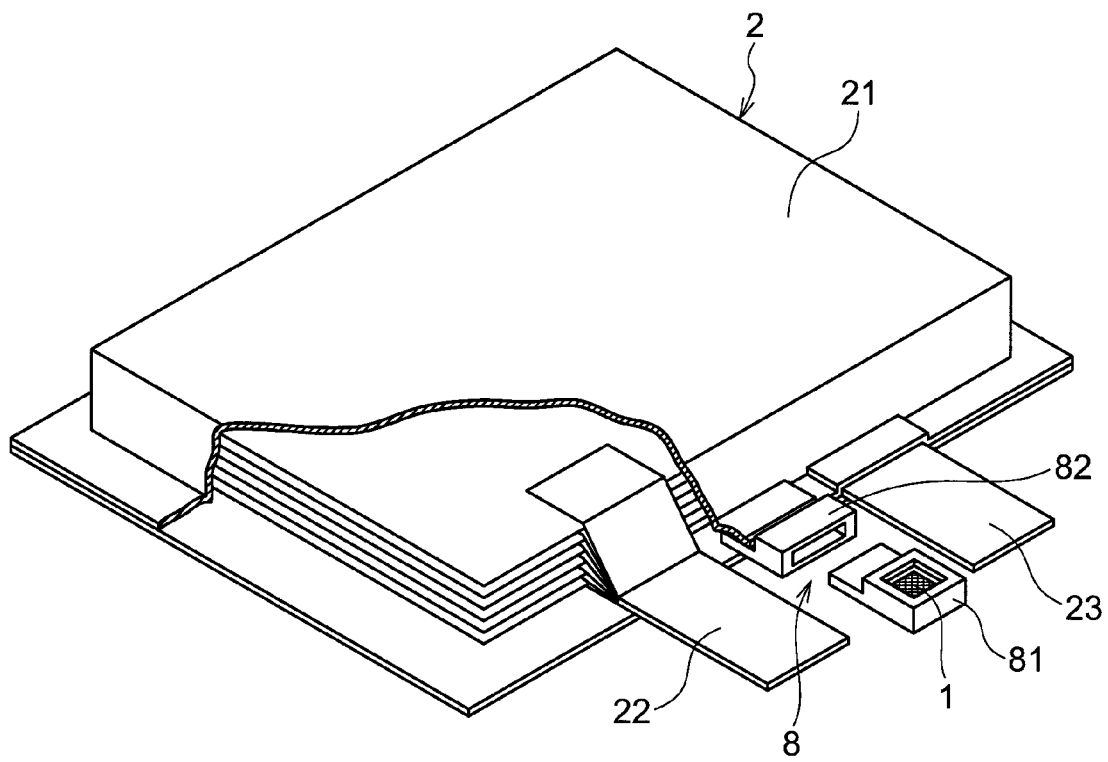
FIG. 13 is a partially cross eyed perspective view illustrating a laminate type battery to which a safety vent according to a fourth exemplary embodiment of the present invention is attached.

As illustrated in FIG. 10 to FIG. 12, a safety vent 1 of the third exemplary embodiment is of similar configuration to the safety vent 1 of the second exemplary embodiment. However, there are differences of the safety vent 1 of the third exemplary embodiment from the safety vent 1 of the second exemplary embodiment in the point that a empty case 7 is fixed to the gas spout out port 24 of the laminated exterior casing 21, and also in the point that the safety vent 1 is fixed to the laminated exterior casing 21 with the empty case 7 interposed therebetween.

As illustrated in FIG. 10 to FIG. 12, the empty case 7 is a flattened angular column shaped empty body that is open at one end and closed at the other end. A gas spout out port 70 that spouts out gas from inside the laminate type battery 2 is formed in the vicinity of the other end. Note that the empty case 7 may be configured such that the other end has a rounded shape. The empty case 7 is fixed to the gas spout out port 24 of the laminated exterior casing 21 at the one end, namely on the open end portion side, using an adhesive 62.

The safety vent 1 is fixed to the gas spout out port 70 formed portion of the outside face of the empty case 7 at the flange portion 52 of the housing case 5 using an adhesive 61. Note that in the example illustrated in FIG. 10 to FIG. 12, the housing case 5 and the empty case 7 are formed as separate bodies, however the housing case 5 and the empty case 7 may be formed integrally to each other.

In the third exemplary embodiment, the safety vent 1 is fixed to the laminated exterior casing 21 with the empty case 7 interposed therebetween. The adhesion surface area between the empty case 7 and the laminated exterior casing 21 can accordingly be made larger than the adhesion surface area between the housing case 5 and the laminated exterior casing 21 when the safety vent 1 is directly attached to the laminated exterior casing 21. The safety vent 1 can accordingly be more securely attached to the laminated exterior casing 21 than when the safety vent 1 is adhered and fixed directly to the laminated exterior casing 21.

The opening portion of the empty case 7 may also be employed as an opening portion for introducing electrolyte inside the laminated exterior casing 21 prior to adhering and fixing the safety vent 1 to the opening portion of the empty case 7.

Fourth Exemplary Embodiment

As illustrated in FIG. 13 to FIG. 17, the fourth exemplary embodiment differs from the third exemplary embodiment in the point that a empty case 8 is provided, the empty case 8 including a first empty case 81 in which the safety vent 1 is housed, and a second empty case 82 that is fixed to the gas spout out port 24 of the laminated exterior casing 21.

Figure 14:
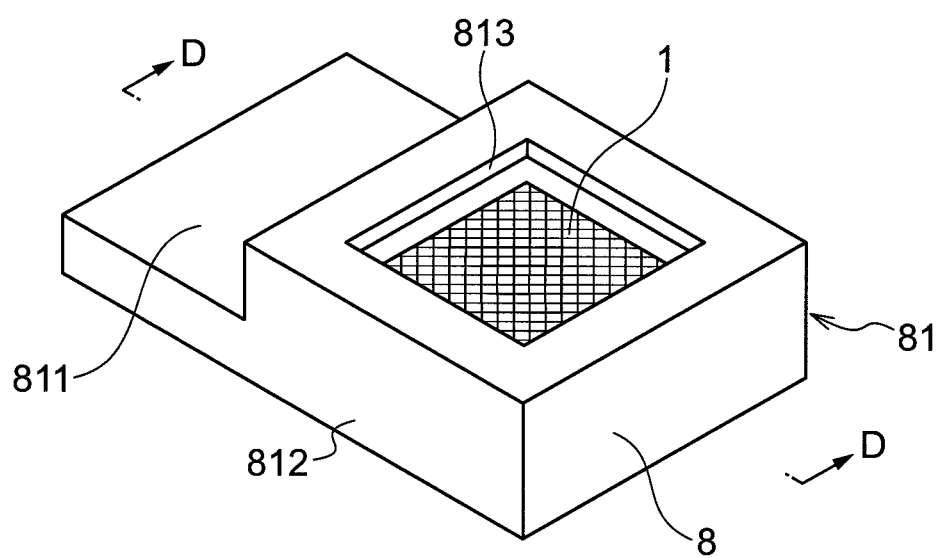
FIG. 14 is a perspective view illustrating a housing case of a safety vent of the fourth exemplary embodiment of the present invention.
Figure 15:
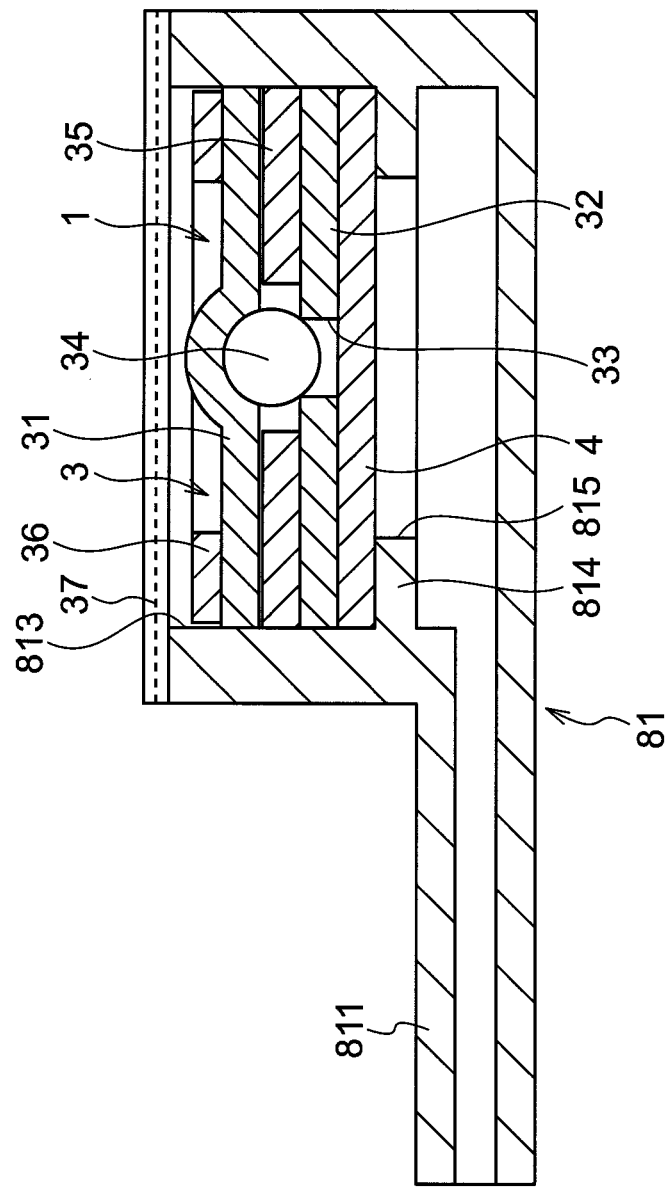
FIG. 15 is a cross-section of the housing case illustrated in FIG. 14, taken along line D-D.

As illustrated in FIG. 14 and FIG. 15, the first empty case 81 has a flattened angular pipe shape and is bent into an L-shape as a whole. One end portion thereof is configured as a first joint portion that fits into the second empty case 82, while the other end portion thereof is configured as a housing case 812 in which the safety vent 1 is housed.

The housing case 812 includes a gas spout out port 813 that is open at an upper face, and a bottom face 814. A gas passing hole 815 through which gas passes is formed at a central portion of the bottom face 814. The gas permeated membrane 4, the vent seat 32, the vent body 34, and the plane spring 31 are housed in that sequence from bottom to top inside the housing case 812. Note that the gasket 35 is inserted between the vent seat 32 and the plane spring 31. The spring form fixing portion 36 is fitted in above the plane spring 31, thereby fixing the gas permeated membrane 4, the vent seat 32, the vent body 34, the gasket 35 and the plane spring 31 inside the housing case 812. Note that the porous metallic foil body 37 is fixed to the gas spout out port 813.

Figure 16:
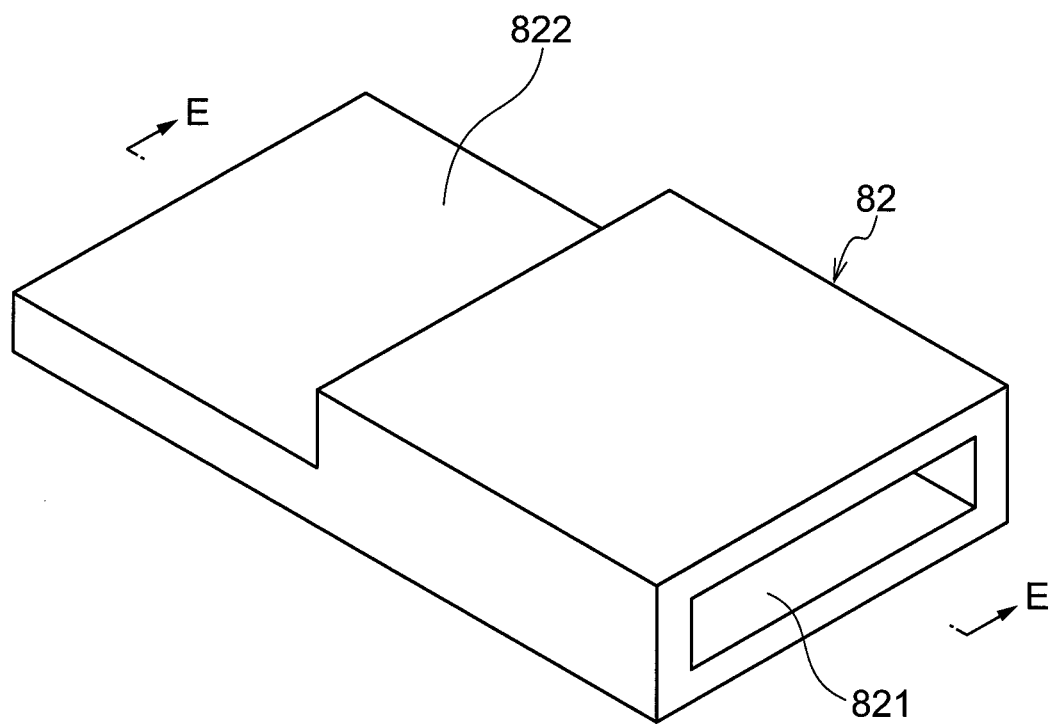
FIG. 16 is a perspective view illustrating a empty case provided with a safety vent according to the fourth exemplary embodiment of the present invention.
Figure 17:
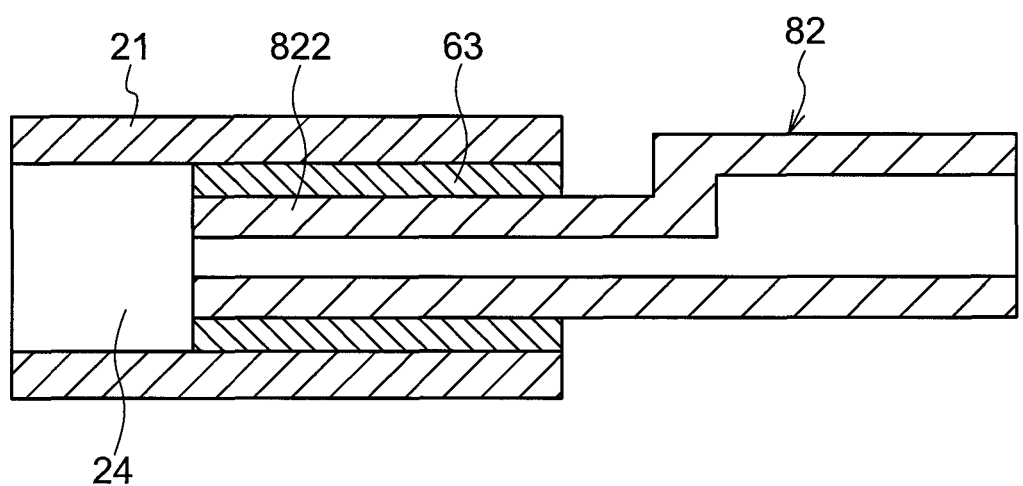
FIG. 17 is a cross-section of the empty case illustrated in FIG. 16, taken along line E-E.

As illustrated in FIG. 16 and FIG. 17, the second empty case 82 is configured in a flattened pipe shape as a whole, with one end portion configuring a second joint portion 821 into which the first joint portion 811 of the first empty case 81 is inserted, and the other end portion configuring a third joint portion 822 that is fixed to the gas spout out port 24 of the laminated exterior casing 21. As illustrated in FIG. 17, the third joint portion 822 is fixed to the gas spout out port 24 of the laminated exterior casing 21 using an adhesive 63. Note that the first joint portion 811 of the first empty case 81 may be adhered and fixed, or may be detachably fitted, in a fitted together state with the second joint portion 821 of the second empty case 82.

In the fourth exemplary embodiment, the safety vent 1 is fixed to the laminated exterior casing 21 with the empty case 8 interposed therebetween. The adhesion surface area between the empty case 8 (the second empty case 82) and the laminated exterior casing 21 can accordingly be made larger than the adhesion surface area between the housing case 5 and the laminated exterior casing 21 when the safety vent 1 is directly attached to the laminated exterior casing 21.
The safety vent 1 can accordingly be more securely attached to the laminated exterior casing 21 than when the safety vent 1 is directly adhered and fixed to the laminated exterior casing 21.

Moreover, electrolyte can be introduced inside the laminate type battery 2 through the second empty case 82 after fixing the third joint portion 822 of the second empty case to the gas spout out port 24 provided to the exterior casing 21 of the laminate type battery 2 and prior to fitting the first joint portion 811 of the first empty case 81 into the second joint portion 821 of the second empty case 82 and joining together the first empty case 81 and the second empty case 82.

Fifth Exemplary Embodiment

Figure 18:
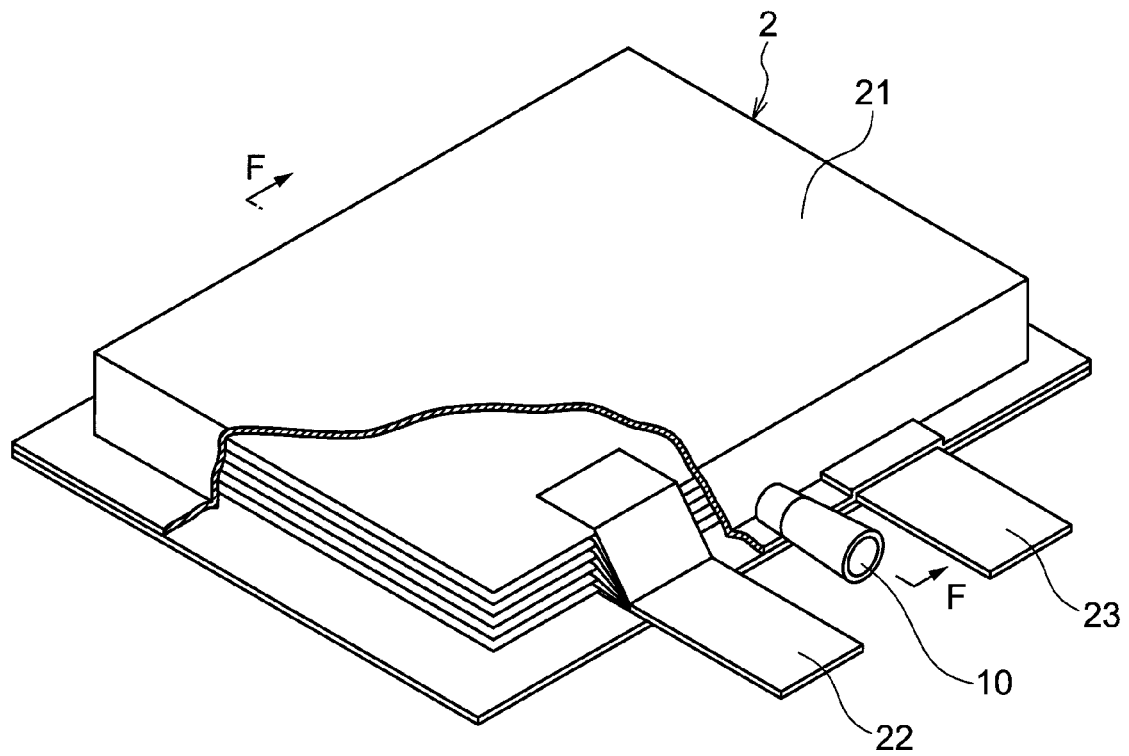
FIG. 18 is a partially cross eyed perspective view illustrating a laminate type battery to which a safety vent according to a fifth exemplary embodiment of the present invention is attached.
Figure 19:
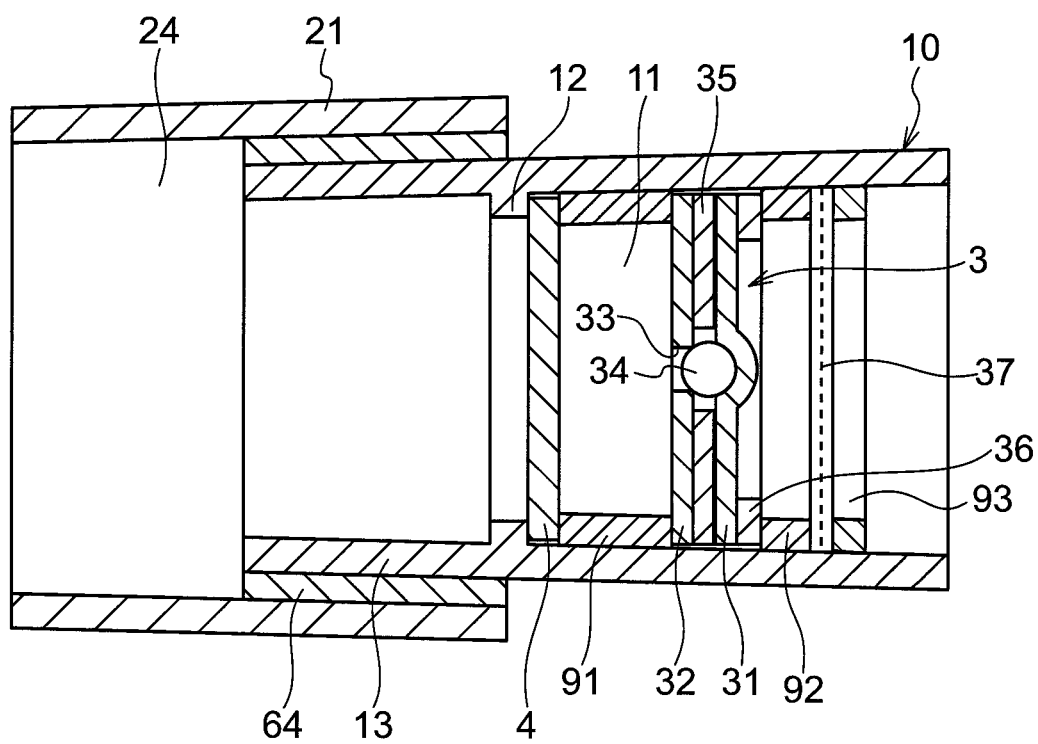
FIG. 19 is a cross-section of the laminate type battery illustrated in FIG. 18, taken along line F-F.

As illustrated in FIG. 18 and FIG. 19, a safety vent 1 of the fifth exemplary embodiment is configured such that the gas permeated membrane 4 and the vent 3 are housed inside a cylinder shaped housing case 10 that is fixed to the gas spout out port 24 of the laminated exterior casing 21.

As illustrated in FIG. 18 and FIG. 19, the housing case 10 is configured with a substantially circular cylinder shape provided so as to taper from the other end portion towards one end portion. A joint portion 13 that is a constriction side end portion is fixed to the gas spout out port 24 of the laminated exterior casing 21 using an adhesive 64. Note that face roughening treatment is performed on the surface of the joint portion 13 in order to secure adhesion force with the inside face of the laminated exterior casing 21.

As illustrated in FIG. 19, the gas permeated membrane 4, a ring shaped fixing member 91, the vent seat 32, the vent body 34 and the gasket 35, the plane spring 31, a ring shaped fixing member 92, the porous metallic foil body 37 and a ring shaped fixing member 93 are housed in that sequence inside the housing case 10 from the constriction end portion towards an enlarged end portion of the housing case 10. A circular ring shaped stopper 12 is provided to an inner wall face of the housing case 10 so as to project towards the radial direction inside. The gas permeated membrane 4 is fixed at a specific position by the stopper 12 and the ring shaped fixing member 91. The vent 3 that is configured by the vent seat 32, the vent body 34, the gasket 35, and the planar spring 31 is fixed by the ring shaped fixing member 91 and the ring shaped fixing member 92 such that a gap 11 is present between the vent 3 and the gas permeated membrane 4.

In the safety vent 1 of the fifth exemplary embodiment, the vent 3 and the gas permeated membrane 4 are integrated together by the housing case 10, and the housing case 10 is fixed to the laminated exterior casing 21 of the laminate type battery 2. The safety vent 1 can accordingly be easily and firmly attached to the laminated exterior casing 21 that is low in strength.

The gap 11 is formed between the gas permeated membrane 4 and the vent 3. Pressure loss during gas release can accordingly be reduced further than in the safety vent 1 of the first exemplary embodiment to the fourth exemplary embodiment in which the gas permeated membrane 4 and the vent 3 are in close contact with each other.

Moreover, the housing case 10 of the safety vent 1 is configured with a tapered shape that gets smaller on progression towards the joint portion 13. Insertion of the joint portion 13 into the gas spout out port 24 of the laminated exterior casing 21 can accordingly be performed more easily than when an outer peripheral face of the housing case 10 is not configured with a tapered shape.

EXAMPLES

In order to verify the advantageous effects of the present invention, 10 samples of 1200 F sheet type electric double layer capacitors are produced. Alkali activated carbon, that readily generates gas, is employed as activated carbon, and the electrolyte employs tetraethyl ammonium tetrafluoroborate (TEABF) as an electrolyte dissolved in difluoroether at a concentration of 1.2 mol/l. Testing is carried out with the safety vent 1 of the fifth exemplary embodiment attached to a laminated outer body in 5 out of the 10 electric double layer capacitors, and the safety vent 1 not attached in the remaining 5 electric double layer capacitors.

Testing is also carried out for 10 standard laminate type lithium secondary batteries with LiCoOx anodes and artificial graphite cathodes. The lithium secondary batteries are employed in electric scooters and have a capacity of 20 AH each.

Testing is performed with the safety vent 1 of the fifth exemplary embodiment mounted to 5 out of the 10 lithium secondary batteries, and the safety vent 1 not mounted to the remaining 5 lithium secondary batteries.

In the safety vent 1, the external diameter of the joint portion 13 of the housing case 10 is 4 mm. In the laminated exterior casing 21 that houses the sheet type double layer capacitor, the internal diameter of the gas spout out port 24 into which the joint portion 13 of the housing case 10 is inserted is 4 mm, and the external diameter of the gas spout out port 24 is 6 mm.

As the porous metallic foil body 37 a spongiform nickel plate having a thickness of 1 mm and used for nickel-hydride secondary battery is employed. The planar spring 31 employed is configured as illustrated in FIG. 3 and is manufactured by Optnics Precision Co., Ltd., with a thickness of 50 µm and pressure regulated at 0.6 kg/cm².

The gas permeated membrane 4 employed is manufactured by Optnics Precision Co., Ltd., and is configured with polyvinylidene fluoride coated on both faces of the base cloth 41 at a thickness of 2 µm. The base cloth 41 is a nonwoven fabric with a material thickness of 20 µm and with a fiber diameter or 3.0 µm obtained by electro-spinning a polyvinylidene fluoride resin and a polyacrylonitrile resin.

The test conditions are as set out below. The test conditions for the electric double layer capacitors are to perform charging 5 times a day for 25 days under conditions of 45° C. and 40 mA/F, monitoring the presence or absence of gas generation and of liquid leakage. The test conditions for the lithium secondary batteries are performing charging and discharging for 25 days under conditions of 5 cycles at a frequency of 2 times a day at 45° C., and at SOC, 80%, monitoring the presence or absence of gas generation and of liquid leakage. Results are illustrated in Table 1.

TABLE 1

| | Safety Vent Present/Absent | Rated Specification | | Endurance Testing (45° C.) | |
|---|---|---|---|---|---|
| | Self-return Type Safety Vent | Capacity | Voltage | Leakage | Liquid Leakage |
| Electric Double Layer Capacitor | Present | 1200 F | 2.9 V | 0/5 | 0/5 |
| | Absent | 1200 F | 2.9 V | 5/5 | 5/5 |
| Lithium Ion Battery | Present | 20 AH | 4.3 V | 0/5 | 0/5 |
| | Absent | 20 AH | 4.3 V | 5/5 | 5/5 |

Electric Double Layer Capacitors

Generally, an alkali activation carbon is employed in order to improve characteristics of an electric double layer capacitor. Although expensive, alkali activation carbons are effective in improving the capacity per unit. However on the other hand, during use in a higher temperature, a tiny amount of remaining alkali acts as a catalyst, with the activated carbon oxidizing at usage of 2.5V to 2.9V and generating large amounts of gas, such that an electric double layer capacitor cannot be used without a self-return type safety vent.

In the results illustrated in Table 1, expanding due to gas generation and electrolyte leakage occurs when the safety vent is not provided.

On the other hand, it can be confirmed that expanding due to gas generation and electrolyte leakage is not observed even at 45° C. when the safety vent 1 is employed.

Lithium Ion Secondary Battery

It is commonly known that capacity, voltage, and spout out rate are generally improved when LiCoOx is employed for the anodes of lithium secondary batteries. The danger of gas generation and catching fire is however anticipated during storage at high temperatures such as 45° C.

However, as indicated in Table 1, expanding due to gas generation and electrolyte leakage is not seen when the safety vent 1 is employed.

INDUSTRIAL APPLICABILITY

As described above, the present invention provides a safety vent that can be securely and firmly attached to a laminated exterior casing that is low in strength in a laminate type electrochemical device such as an electric double layer capacitor or a lithium secondary battery.

In an electrochemical device with the safety vent of the present invention attached to a laminated exterior casing thereof the safety vent is actuated when the internal pressure reaches a predetermined pressure, and electrolyte is separated from byproduct gas by a gas-liquid separating action, and the internally generated gas is allowed to release quickly to return the gas pressure to normal.

The safety vent of the present invention accordingly includes the following features in comparison to conventional safety vents: (1) being driven by a lower pressure internal gas pressure; (2) separation of gas and liquid being performed quickly; (3) having a faster response speed; (4) being made thinner and more compact; (5) achieving higher reliability at a lower cost; and (6) having excellent mass production characteristics.

The safety vent of the present invention is therefore preferably applied to electrochemical devices employed in large size equipment such as HEVs and PEVs, electrochemical devices used in equipment such as a construction machine or a bulldozer that can be used in a severe condition, and electrochemical devices employed in equipment such as large size smartphones.

EXPLANATION OF THE REFERENCE NUMERALS 1 safety vent
2 laminate type battery
3 vent
4 gas permeated membrane
5 housing case
7 empty case
8 empty case
10 housing case
21 laminated exterior casing
24 gas spout out port 24
31 plane spring
34 vent body
41 base cloth
42 fluororesin layer
43 compound film
44 compound film

The invention claimed is:

1. A safety vent comprising:
a gas permeated membrane through which gas generated inside an electrochemical device permeates;
a vent that opens in a case in which pressure inside said electrochemical device is equal to or has exceeded a predetermined target pressure, and allows the gas to release to the outside of said electrochemical device through said gas permeated membrane;
a housing case that internally houses said vent and said gas permeated membrane; and
a joint portion that is empty inside, and formed integrally with said housing case, and attached to a gas spout out port of an exterior casing of said electrochemical device,
wherein the vent comprises:
a vent seat formed with a gas release hole;
a vent body for closing the gas release hole of the vent seat; and
a spring means that presses the vent body against the gas release hole of the vent seat,
wherein the vent is configured such that, in a case in which the pressure inside the electrochemical device is less than the predetermined target pressure, the vent body is pressed against the gas release hole of the vent seat by the spring means, and in a case in which the pressure inside the electrochemical device is equal to or exceeds the predetermined target pressure, the vent body separates from the gas release hole of the vent seat against the urging force applied by the spring means, and
wherein a gap is formed between the gas permeated membrane and the vent.

2. The safety vent of claim 1, wherein:
said spring means is a plane spring comprising
a base portion formed with a plane frame shape, and
a load bearing portion that is resiliently supported through a plurality of spring element portions on an in-plane direction inside of said base portion, wherein said vent body is pressed against said gas release hole by said load bearing portion of said plane spring.

3. The safety vent of claim 1, wherein said gas permeated membrane is formed from a nonwoven fabric or a woven fabric, said nonwoven fabric or woven fabric configured by spun fibers of a polyvinylidene fluoride resin and a polyacrylonitrile resin.

4. The safety vent of claim 3, wherein said gas permeated membrane is a compound film provided with a fluororesin layer on one face or on both faces of said nonwoven fabric or woven fabric.

5. The safety vent of claim 3, wherein said gas permeated membrane has a thickness of from 15 µm to 60 µm.

6. The safety vent of claim 3, wherein said gas permeated membrane has a fiber diameter of from 0.1 µm to 0.6 µm, and a pore diameter of from 0.25 µm to 0.35 µm.

7. An electrochemical device comprising:
an exterior casing formed with a gas spout out port, wherein
the safety vent of claim 1 is attached to said gas spout out port of said exterior casing.

8. The electrochemical device of claim 7, wherein said exterior casing is a laminate type exterior casing.

* * * * *